United States Patent [19]

Noda et al.

[11] 3,997,513
[45] Dec. 14, 1976

[54] SOLUTION FOR FORMING THERMAL RESISTING POLYMERS

[75] Inventors: Yuzuru Noda; Makoto Kojima; Shiro Mazaki; Yasutada Katashiba, all of Ibaragi, Japan

[73] Assignee: Nitto Electric Industrial Co., Ltd., Ibaragi, Japan

[22] Filed: Dec. 6, 1974

[21] Appl. No.: 530,099

Related U.S. Application Data

[63] Continuation of Ser. No. 347,761, April 4, 1973, Pat. No. 3,896,089.

[30] Foreign Application Priority Data

Apr. 4, 1972   Japan .............................. 47-34046

[52] U.S. Cl. ...................................... 260/77.5 TB
[51] Int. Cl.$^2$ ...................................... C08G 22/32
[58] Field of Search ...... 260/29.1, 33.4 P, 77.5 TB, 260/78 TF, 32.6 NT

[56] References Cited

UNITED STATES PATENTS

| | | | |
|---|---|---|---|
| 3,625,911 | 12/1971 | Redman | 260/30.2 |
| 3,673,145 | 6/1972 | Minami | 260/32.4 |
| 3,838,088 | 9/1974 | Zalewski | 260/78 TF |
| 3,896,089 | 7/1975 | Noda | 260/77.5 TB |

*Primary Examiner*—Paul R. Michl
*Attorney, Agent, or Firm*—Sughrue, Rothwell, Mion, Zinn & Macpeak

[57] ABSTRACT

A concentrated solution suitable for forming thermal resisting polymers having a high degree of polymerization comprising a mixture of a prepolymer solution prepared by the reaction of an organic diisocyanate or diamine and a molar excess of 1,2,3,4-butanetetracarboxylic acid or an anhydride of the acid, and a blocked polyisocyanate.

15 Claims, No Drawings

SOLUTION FOR FORMING THERMAL RESISTING POLYMERS

This is a continuation of application Ser. No. 347,761, filed Apr. 4, 1973, now U.S. Pat. No. 3,896,089.

BACKGROUND OF THE INVENTION

1. Field of the Invention

The present invention relates to a solution for forming thermal resisting polymers and more particularly it relates to a concentrated solution suitable for forming a highly polymerized thermal resisting polymers having an imide ring and, as the case may be, a hydantoin ring or an amide linkage in the main chain of the polymer by heating the solution. The invention relates further to a process of preparing such a solution.

2. Description of the Prior Art

It is known that polyimides, polyamideimides, polyimidazoles, or copolymers thereof have high thermal resistance, high chemical resistance, and other quite excellent properties and, in particular, these polymers or copolymers are very useful as materials for preparing wire coats, films, laminates, coating materials, adhesives, impregnation varnishes, etc., to be used at high temperatures.

These thermal resisting polymers have generally been prepared by reacting starting materials, e.g., a tetracarboxylic acid dianhydride and a diamine in case of preparing polyimide, in an organic polar solvent such as N-methyl-2-pyrrolidone, N,N-dimethylformamide, N,N-dimethylacetamide, etc., to provide a polymer precursor and then subjecting the polymer precursor to a treatment such as a heat treatment to provide the desired thermal resisting polymer. Since the thermal resisting polymer thus obtained has generally been converted into an infusible and insoluble material, the final polymer is poor in processability. Accordingly, processing operations are usually conducted on the aforesaid liquid polymer precursor having a sufficiently high molecular weight, and in this case it is desired, from the aspects of workability and economy, that the solution of the polymer precursor be of high concentration and low viscosity.

However, in order to obtain a processed final polymer having good properties, the polymer precursor must have a sufficiently high molecular weight. On the other hand, the solvent used for the preparation of the polymer precursor is, in general, expensive, and further there is a limit on the solubility of the polymer precursor in the solvent. Therefore, if a polymer precursor having a sufficiently high molecular weight is desired, the solution thereof inevitably becomes highly viscous, which results in reducing the working property. If it is desired to reduce the viscosity of the solution of the polymer precursor, a large amount of the solvent must be used, which results in making the production uneconomical and reduces the concentration of the polymer precursor.

Thus, in order to prepare a solution of the polymer precursor suitable for processing, a large amount of organic polar solvent is required and since such an organic polar solvent is expensive, the solution of the polymer precursor becomes expensive. Therefore, in spite of their excellent properties, conventional thermal resisting polymers have not yet been used in wide fields but have been used only for specific purposes.

The inventors have investigated developing solutions for forming thermal resisting polymers excellent in working property and economical aspects which are not accompanied by the aforesaid faults, and as a result thereof, the inventors have discovered that a highly concentrated low viscosity solution for forming thermal resisting polymers can be obtained in an inexpensive solvent without using an expensive organic solvent or with a greatly reduced amount of expensive organic polar solvent.

SUMMARY OF THE INVENTION

That is, according to the present invention there is provided a solution, particularly a concentrated solution for forming thermal resisting polymers, comprising a mixture of a prepolymer solution and a blocked, stable polyisocyanate compound in an approximately stoichiometric equivalent amount to the amount of the prepolymer, the above prepolymer having been prepared by reacting an organic diisocyanate or diamine and a molar excess amount of 1,2,3,4-butanetetracarboxylic acid or an anhydride thereof and having an imide group in the main chain of the molecule and an acid group at both terminals of the molecule.

By subjecting the aforesaid concentrated solution of the prepolymer thus prepared (after processing properly according to the use) to a close-ring polycondensation by heat treating it while evaporating off the solvent of the solution, the prepolymer solution can be converted into a polymer having sufficient toughness and high thermal resistance.

DETAILED DESCRIPTION OF THE INVENTION

The prepolymer solution used in this invention is prepared by reacting under heating an organic diisocyanate or an organic primary diamine and a molar excess of 1,2,3,4-butanetetracarboxylic acid or an anhydride thereof in an organic acidic solvent such as a phenol, a cresol, a xylenol, etc., or as the case may be, an organic polar solvent such as N,N-dimethylformamide, N,N-dimethylacetamide, N-methyl-2-pyrrolidone, etc.

The aforesaid solvent may be also used together with an organic non-polar solvent such as toluene, xylene, benzene, solvent naphtha, etc.

The amount of the 1,2,3,4-butanetetracarboxylic acid or the anhydride thereof to be used in the above reaction is 1.1 to 2.2 mols, preferably 1.3 to 2.0 mols, per mol of the organic diisocyanate or the organic primary diamine. The concentration of the reaction system is preferably 30 to 95% by weight, in particular, 40 to 65% by weight for increasing the reaction rate. Furthermore, when the aforesaid reaction is conducted at temperatures above 30° C, preferably at temperatures of 130° to 200° C, better results such as high reaction rate and less occurence of side reactions can be obtained.

Now, the production of the prepolymer solution by the reaction of 1,2,3,4-butanetetracarboxylic acid (hereinafter, the acid is called "BTC") or an anhydride thereof (hereinafter, the anhydride is called "BTCA") and an organic diisocyanate or an organic primary diamine will be explained practically by the following examples.

1. Reaction of BTC-organic primary diamine system:

This reaction is a dehydration reaction and since the dehydration reaction occurs abruptly at reaction temperatures of 130° to 140° C, water formed in the dehydration reaction is removed from the reaction system. As the reaction progresses, the color of the solution changes gradually to black-brown. Furthermore, when the reaction temperature is further raised and the reaction is continued at 190° to 200° C, the distillation out of water ceases after about 20 to 30 minutes. The end of the reaction, that is, the formation of the imide group-containing tetracarboxylic acid prepolymer, is confirmed by estimating the content of acid by an alkali method. The reaction is completed when the reaction is carried out for about 2 to 3 hours after raising the temperature of the reaction system to 190° to 200° C, and the reaction does not then proceed even if the heating of the system is further continued.

Also, if it is desired to further decrease the viscosity of the solution in the reaction, the polymerization may be conducted in the presence of a monoalcohol, a dialcohol, or a trialcohol.

This reaction does not stop in the form of amide acid as an imidation reaction proceeds at almost the same temperature as the amidation, and the imide group-containing tetracarboxylic acid prepolymer has excellent solubility in such inexpensive solvent as cresols, xylenols, etc. Also, since the carboxyl group of BTC is active, the amidation reaction proceeds at a higher reaction rate than the rate of forming an amide group from a carboxyl group bonded to an aromatic ring and an amino group generally conducted, and then the imidation reaction proceeds at the same temperature.

The above is explained for the case of using BTC, but an imide group-containing tetracarboxylic acid prepolymer having a similar acid content can be obtained by using BTCA.

2. Reaction of a BTC-organic diisocyanate system:

This reaction is a carbon dioxide removal reaction and dehydration reaction and since the formation of water and carbon dioxide occurs abruptly at reaction temperatures of 130° to 140° C, these side reaction products are removed from the reaction system. As the reaction progresses, the color of the solution changes gradually to black-brown. When the reaction temperature is further raised and the reaction is continued at 190° to 200° C, the distillation out of water ceases after about 20 to 30 minutes.

The reaction is finished about 2 to 3 hours after the increase of the reaction temperature to 190° to 200° C, and the reaction does not proceed even if the heating is continued. It is preferable to use as the solvent for the reaction an organic acidic solvent such as a phenol, a cresol, a xylenol, and the like.

Furthermore, it has been discovered that in the reaction, the polycondensation of the BTC and the organic diisocyanate occurs very easily to form an imide group-containing tetracarboxylic acid prepolymer, the structure of which is the same as that of the case of reacting BTCA and the organic diisocyanate.

It is well known that an isocyanate group is quite a reactive functional group and is caused to react with compounds having active hydrogen to provide various compounds. In particular, it is feared that various side reactions occur caused by the reaction of the isocyanate group and water. However, in the reaction of BTC and the organic diisocyanate, the aforesaid side reactions scarcely occur and a prepolymer the same as the imide group-containing tetracarboxylic acid prepolymer obtained by the aforesaid reaction (1) is obtained.

That is, it has been believed that in the reaction of BTC and an organic diisocyanate an isocyanate group is first caused to react with a carboxyl group to cause dioxide removal reaction and to form an amide acid, and then a dehydration reaction occurs at almost the same temperature to easily cause the imidation, and thus it is an astonishing phenomenon that in spite of the occurence of the dehydration reaction the isocyanate group actively acts to cause the imidation reaction without side reactions, and the imide group-containing tetracarboxylic acid prepolymer having a theoretical acid content is obtained.

As the blocked polyisocyanate compounds to be blended with the aforesaid prepolymer for providing the solution of this invention, there are illustrated the blocked compounds obtained by reacting a polyisocyanate and a compound represented by the formula

ROH wherein R represents a monovalent aromatic group, a monovalent alicyclic group or a monovalent aliphatic group.

Among these blocked compounds, the blocked compound of a polyisocyanate having at least one of an imide group, a hydantoin group and an amide group in the main chain of the molecule gives particularly preferable results for obtaining the concentrated solution for forming polymers having good thermal resistance, good mechanical properties and good electric properties. However, the blocked compounds of such diiso- or dithioisocyanates as p-phenylenediisocyanate, 2,4-tolylenediisocyanate, 1,5-naphthylenediisocyanate, 4,4'-diphenylmethane diisocyanate, 4,4'-diphenylether diisocyanate, hexamethylene diisocyanate, cyclohexane-1,4-diisocyanate, p-phenylene dithioisocyanate, 4,4'-diphenylmethane dithioisocyanate, etc., as well as the blocked compounds of polyisocyanate having a comparatively low molecular weight such as Desmodur AP-Staple, Desmodur CT-Staple, (trade names, made by Farbenfabriken Bayer Aktiengesellshaft), and the like can be also used in this invention.

In addition, examples of the compounds having the formula ROH used in the above reaction include phenols, cresols, xylenols, and alcohols.

Furthermore, examples of the aforesaid blocked compound of polyisocyanate having at least one of an imide group, a hydantoin group and an amide group are as follows:

A. A blocked compound of an imide group-containing polyisocyanate prepared by dissolving BTC or BTCA and a molar excess amount of an organic diisocyanate in a solvent such as a phenol, a cresol, a xylenol, or a mixture thereof and reacting them by heating. The amount of the organic diisocyanate used in this reaction is 1.1 to 2.2 mols, preferably 1.3 to 2.0 mols, per mol of BTC or BTCA. When the above components are reacted by heating in the aforesaid solvent, carbon dioxide is split off and a dehydration reaction occurs at 130° to 140° C, but the side reaction of the water formed and the isocyanate group hardly occurs. This is considered to be based on the fact that when the reaction temperature of the reaction system reaches near 130° C (at which temperature the dehydration reaction occurs), the isocyanate group is stabilized by being blocked with the phenol, cresol, or xylenol used as the solvent for the reaction.

When the reaction is further raised and the reaction is conducted at 150° to 200° C, the isocyanate group forms an imide group by reaction with BTC or BTCA to provide the imide group-containing polyisocyanate, and when the temperature is reduced to below 150° C, the terminal isocyanate groups are caused to react with the solvent to form the blocked compound.

It is preferable, for increasing the reaction rate, that the concentration of the raw materials to be reacted be 10 to 90% by weight, preferably 30 to 60% by weight.

The concentrated solution of this invention prepared by mixing the blocked compound of the imide group-containing polyisocyanate prepared above and the above imide group-containing tetracarboxylic acid prepolymer solution is effective, when used as varnish for electric wires, for providing thermal resisting coated wires having excellent Freon resistance.

B. A blocked compound of an amide and imide group-containing polyisocyanate being isocyanate groups at both terminals of the molecule prepared by reacting the organic tribasic acid anhydride represented by the general formula

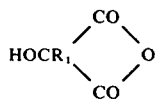

wherein $R_1$ represents a trivalent organic group and a molar excess amount of an organic diisocyanate.

As the organic tribasic acid anhydride to be used in the above reaction, there are illustrated trimellitic anhydride, 4-carboxydiphenylmethane-3',4'-dicarboxylic acid anhydride, 3-carboxydiphenylmethane-3',4'-dicarboxylic acid anhydride, 4-carboxydiphenylketone-3',4'-dicarboxylic acid anhydride, and the like. Also, the aforesaid organic tribasic acid anhydrides may be partially substituted by an organic dibasic acid such as terephthalic acid and isophthalic acid and in such case the above-mentioned organic dibasic acid acts as a component effective for forming an amide group.

The amount of the organic disocyanate used in this invention is 1.1 to 4.0 mols, preferably 1.2 to 2.0 mols per mol of the organic tribasic acid anhydride. When they are reacted in an organic polar solvent at 50° to 210° C, preferably 80° to 130° C, the amide and imide group-containing polyisocyanate is prepared.

It is preferable that the concentration of the raw materials to be reacted be high, particularly 50 to 90% by weight.

This reaction proceeds gradually while generating carbon dioxide and with the progress of the reaction, the color of the reaction system changes to black-brown. The end of the reaction can be determined by estimating the isocyanate group by an n-butylamine method. When the isocyanate content reaches the theoretical amount, the product is blocked by a phenol, a cresol, a xylenol, or an alcohol according to a known manner, whereby the blocked compound of the amide and imide group-containing polyisocyanate is obtained.

The concentrated solution of this invention prepared by mixing the blocked compound thus prepared and the aforesaid imide group-containing tetracarboxylic acid prepolymer is effective, when used as varnish for electric wire, for giving thermal resisting coated wires having excellent abrasion resistance and Freon resistance.

C. A blocked compound of a polyisocyanate having a hydantoin ring, a part of which may be, as the case may be, hydantoic acid or a lower alkyl ester thereof, in the main chain of the molecule, and having isocyanate groups at both terminals of the molecule prepared by reacting the glycine derivative represented by the general formula

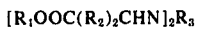

wherein $R_1$ and $R_2$, which may be the same or different, each represents a hydrogen atom or a lower alkyl group and $R_3$ represents a divalent organic group and a molar excess amount of an organic diisocyanate.

As the glycine derivatives used in the above reaction, aromatic ones are preferable but aliphatic and alicyclic ones may also be used. Examples of such glycine derivatives are p-phenylenebis(iminoacetic acid), m-phenylenebis(iminoacetic acid), 4,4'-diphenylenebis-(iminoacetic acid), 4,4'-diphenylbis(iminoacetic acid), 4,4'-diphenyletherbis(iminoacetic acid), 4,4'-diphenylmethanebis(iminoacetic acid), 4,4'-benzophenonebis(iminoacetic acid), 4,4'-diphenylsulfonebis(iminoacetic acid), p-cyclohexyenebis(iminoacetic acid), m-cyclohexylenebis(iminoacetic acid), hexamethylenebis(iminoacetic acid), the lower alkyl esters thereof, and isomers thereof.

The preferred amount of the organic diisocyanate used in this reaction is 1.1 to 4.0 mols, more preferably, 1.2 to 2.0 mols per mol of the aforesaid glycine derivative, and by reacting them in an organic acidic solvent such as a cresol, a xylenol, etc., at temperatures of 30° to 210° C, the polyisocyanate having a hydantoin and, as the case may be, a functional group having a hydantoin ring forming faculty in the main chain of the molecule and further having isocyanate groups at both terminals of the molecule is prepared.

It is desirable that the concentration of the raw materials to be reacted be high, preferably 50 to 90% by weight.

When, after conducting the reaction for 20 to 60 minutes at 30° to 60° C, the temperature of the reaction system is gradually raised, the reaction proceeds while forming water in the case of using the iminoacetic acid, and generating alcohol in the case of using the alkyl ester of the iminoacetic acid at about 120° C. As the reaction progresses, the color of the reaction system becomes black-brown. When the reaction is further conducted at an elevated temperature of 190° to 200° C for 3 to 4 hours, the polyisocyanate containing a theoretical amount of isocyanate is obtained. After the reaction is over, the reaction product is cooled, whereby the isocyanate group of the aforesaid polyisocyanate is caused to react with the solvent thus used to form the blocked compound.

The concentrated solution of this invention prepared by mixing the blocked compound thus obtained with the aforesaid imide group-containing tetracarboxylic acid prepolymer solution is effective, when used as varnish for enameled wires, for giving thermal resisting wires excellent in flexibility and abrasion resistance.

The various kinds of blocked polyisocyanate compounds and the processes of preparing these blocked compounds were explained as above but in order to obtain the concentrated solution of this invention, it is preferred to mix the blocked compound as described above and the imide group-containing tetracarboxylic acid prepolymer in an approximately stoichiometrically equivalent amount, but either of the blocked compound or the prepolymer may be used in an excess amount of up to 20% more than equivalent.

In addition, by the term "stoichiometrically equivalent amount" is meant that two carboxyl groups of the aforesaid prepolymer are used to one isocyanate group of the aforesaid blocked compound.

By mixing the aforesaid prepolymer and the blocked compound in a stoichiometrically equivalent amount ratio, the solution of this invention capable of forming a thermal resisting polymer having a high molecular weight and being excellent in electric properties, mechanical properties and thermal characteristics by heating the solution is obtained.

Furthermore, the imide group-containing tetracarboxylic acid prepolymer to be contained in the solution has a comparatively low molecular weight and has good solubility, while the blocked polyisocyanate compound also has similar properties. Accordingly, the viscosity of the resultant solution can be markedly reduced.

Thus, the solution for forming thermal resisting polymers of this invention has such the feature that it can be used in a highly concentrated state. For example, in the case of use as a varnish for electric wires, the non-volatiles content of the solution may be 20 to 50% by weight and the viscosity of the solution may be 500 to 10,000 c.p. (at 30° C), preferably 1,000 to 6,000 c.p. (at 30° C) and further in the case of use as a solution for forming films, the non-volatiles content of the solution may be 30 to 60% by weight and the viscosity of the solution may be 30,000 to 150,000 c.p. (at 30° C), preferably 50,000 to 120,000 c.p. (at 30° C). That is, since the solution of this invention can be used in a highly concentrated and comparatively low viscosity state, the solution is very advantageous from working and economical aspects.

For preparing thermal resisting polymer films from such a solution of this invention, the solution must be heated to conduct the polymerization reaction thereof and to remove the solvent. It is preferable to add a polymerization accelerator to the solution of this invention. Examples of such a polymerization accelerator include organometal salts such as lead octylate, iron octylate, zinc octylate, lead naphthenate, iron naphthenate, zinc naphthenate, calcium naphthenate, dibutyltin dilaurate, zirconiumacetyl acetonate, aluminumacetyl acetonate, and ironacetyl acetonate and tertiary amines such as dimethylbenzyl amine, pyridine, and triethylene diamine. The post hardening after removing the solvent for obtaining final films is generally conducted at temperatures of 150° to 500° C.

The solution of this invention can be stably stored for a long period of time without being accompanied by deterioration. The solution of this invention can be used at any desired viscosity and concentration according to various uses such as materials for forming films or coatings as well as for impregnation varnishes, laminates, and adhesives.

Now, the production of the imide group-containing tetracarboxylic acid prepolymer used as one component for obtaining the solution of this invention for forming thermal resisting polymers will be illustrated in the following Examples A – E and the production of the blocked compound of polyisocyanate used as another component for obtaining the solution of this invention will be illustrated in the following Examples F – H:

EXAMPLE A

In a 1 liter four-necked flask equipped with a Diens trap having condenser, a thermometer, and a stirrer were placed 234.2 g (1 mol) of BTC, 158 g (0.8 mol) of 4,4'-diaminodiphenylmethane, and 392 g of industrial cresol and then the mixture was heated gradually with stirring.

The dehydration reaction occurred at 110° to 140° C and thus the azeotropic mixture of the water and a small amount of cresol were distilled off. When the mixture was further reacted at a higher temperature of 190° C for 3 hours, 724 g of the concentrated solution of a prepolymer having an acid content of 0.524 (theoretical value being 0.523) was obtained. In addition, the term "acid content" is the value represented by the ratio of the molecular weight of COOH to the molecular weight of the prepolymer.

Since the solution prepared above had a high viscosity, the solution was diluted by 386 g of industrial cresol to adjust the non-volatile content to 30.8% by weight (after drying for 2 hours) at 200° C) and the viscosity of the solution to 2050 c.p. (at 30° C).

EXAMPLE B

In the same flask as in Example A were placed 234.2 g (1 mol) of BTC, 125.0 g (0.5 mol) of 4,4'-diphenylmethane diisocyanate, and 323 g of industrial xylenol and then the mixture was heated gradually with stirring. The dehydration and carbon dioxide removal reaction occurred at 110° – 140° C and thus water and a small amount of xylenol were distilled off. When the mixture was further reacted at an elevated temperature of 200° C for 2 hours and 30 minutes, 645 g of the concentrated prepolymer solution having an acid content of 0.510 (theoretical value being 0.501) was obtained. By diluting the solution obtained with 70 g of industrial xylenol, the solution having a non-volatile content of 45.1% by weight and a viscosity of 82700 c.p. (at 30° C) was prepared.

EXAMPLE C

In the same flask as in Example A were placed 234.2 g (1 mol) of BTC, 140.2 g (0.7 mol) of 4,4'-diaminodiphenyl ether, 100 g of industrial phenol, and 274 g of industrial xylenol and then the mixture was heated gradually with stirring. The dehydration reaction occurred at 110° – 140° C and the water was distilled off together with a small amount of the solvents. Thereafter, when the mixture was further reacted for 5 hours at 180° C, 706 g of the concentrated solution of prepolymer having an acid content of 0.502 (theoretical value being 0.515) was obtained. By diluting the solution with 105 g of industrial cresol, the solution having a non-volatile content of 41.5% by weight and a viscosity of 8600 c.p. (at 30° C) was obtained.

EXAMPLE D

In the same flask as in Example A were placed 234.2 g (1 mol), 180.2 g (0.9 mol) of 4,4'-diaminodiphenyl ether, and 414 g of industrial cresol and the mixture was heated gradually with stirring. The dehydration reaction occurred at 110° – 140° C and thus the water was distilled off together with a small amount of the solvent. Then, when the mixture was reacted for 3 hours at 190° C, 760 g of the concentrated solution having an acid content of 0.440 (theoretical value being 0.458) was obtained. By diluting the solution with 760 g of industrial cresol, the solution having a non-volatile content of 30.2% by weight and a viscosity of 820 c.p. (at 30° C) was obtained.

EXAMPLE E

In the same flask as in Example A were placed 198 g (1 mol) of BTCA, 158 g (0.8 mol) of 4,4'-diaminodiphenylmethane, and 356 g of industrial cresol and the mixture was heated to 80° – 90° C for 30 minutes with stirring. Then, when the temperature of the mixture was raised, the dehydration reaction occurred at 110° – 140° C, whereby the imidation reaction occurred and at the same time the terminal acid anhydride groups of BTCA caused the ring-close. Thereafter, when the reaction product was maintained at 190° C for 3 hours, 682 g of the concentrated solution of prepolymer having an acid content of 0.520 (theoretical value being 0.515) was obtained.

By diluting the solution with 128 g of industrial cresol, the solution having a non-volatile content of 39.8% by weight and a viscosity of 12500 c.p. (at 30° C) was obtained.

EXAMPLE F

In the same flask as in Example A were placed 250 g (1 mol) of 4,4'-diphenylmethane diisocyanate and 367 g of industrial cresol and the mixture was heated to 150° – 165° C for 1 hour with stirring to block the isocyanate group by cresol. Then when 117 g (0.5 mol) of BTC was added to the mixture, the imidation reaction proceeded with the generation of water and carbon dioxide. During the reaction, the carbon dioxide and water were distilled off together with a small amount of cresol. Then, the reaction product was maintained at 150° – 165° C for 5 hours and after adding thereto 45 g of industrial cresol, the mixture was cooled. Thus, 655 g of the solution of the imide group-containing polyisocyanate blocked compound having a NCO content of 0.241 (theoretical value being 0.2407), a non-volatile content of 45.4% by weight, and a viscosity of 82400 c.p. (at 30° C) was obtained. In addition, the NCO content is a value represented by the ratio of the molecular weight of NCO to the molecular weight of the polyisocyanate blocked compound.

EXAMPLE G

In the same flask as in Example A were placed 250 g (1 mol) of 4,4'-diphenylmethane diisocyanate, 153.6 g (0.8 mol) of trimellitic acid anhydride, 100 g of N-methyl-2-pyrrolidone, and 76 g of xylene and the mixture was heated with stirring. A homogeneous solution was obtained at about 70° C and when the temperature of the system was raised to 100° C, the reaction proceeded while generating vigorously carbon dioxide. When the reaction was continued at the temperature, the color of the solution changed into black-brown after 2 hours and further the NCO content reached the theoretical value (0.252) after 4 hours and 30 minutes. Thus, 683 g of industrial cresol was added to the reaction product and after stirring it for 1 hour at 150° – 160° C to block the isocyanate group by cresol, the product was cooled. Thus, the solution of the polyisocyanate blocked compound having an imide group and an amide group and further having a non-volatile content of 30.4 g by weight and a viscosity of 2150 c.p. (at 30° C) was obtained.

EXAMPLE H

In the same flask as in Example A were placed 250 g (1 mol) of 4,4'-diphenylmethane diisocyanate, and 490 g of industrial xylenol and then the former was dissolved in the solvent at 35° – 45° C. Then, after adding to the solution 239.6 g (0.7 mol) of 4,4'-diphenylmethane bis(methyl iminoacetate), the reaction was conducted for 30 minutes at 50° C. When the temperature was raised gradually, the demethanol reaction occurred at about 150° C and the viscosity of the system increased. The temperature was raised further while removing the methanol formed from the system and the reaction was further continued for 3 hours at 200° – 210° C. Then, after adding 173 g of industrial cresol, the product mixture was cooled, whereby the solution of hydantoin ring-containing polyisocyanate blocked compound having the NCO content of 0.189 (theoretical value being 0.1889) was obtained. The solution had a non-volatile content of 39.7% by weight and a viscosity of 8750 c.p. (at 30° C).

Now, the preparation of the solution of this invention for forming heat resisting polymers will be practically explained by the following examples.

EXAMPLE 1

A mixture of 400 g of the imide group-containing tetracarboxylic acid prepolymer solution prepared in Example A and 400 g of the solution of the imide group-containing polyisocyanate blocked compound prepared in Example G was stirred well to provide the solution of this invention for forming thermal resisting polymers having a non-volatile content of 29.8% by weight and viscosity of 2090 c.p. (at 30° C). When the solution was stored for 6 months at 30° C, the change of physical properties such as viscosity and color was scarcely observed.

The solution prepared above was coated on the annealed copper wires having a diameter of 1.00 mm by means of a die and baked thereon at tower temperature of 420° C and a rate of 6.0 m/min in a vertical research tower having a length of 3 m. The properties of the thus enameled wires are shown in Table 1.

EXAMPLE 2

A mixture of 306 g of the imide group-containing tetracarboxylic acid prepolymer prepared in Example E, 400 g of the solution of the polyisocyanate blocked compound prepared in Example G, and 94 g of industrial cresol was stirred well to provide the solution of this invention having a non-volatile content of 30.6% by weight and a viscosity of 2230 c.p. (at 30° C). When the solution was stored for 6 months at 30° C, no change in physical properties was observed.

The solution prepared above was used as varnish for enameled wires and coated and baked on enameled wires as in Example 1. The properties of the enameled wires obtained are shown in Table 1.

EXAMPLE 3

A mixture of 400 g of the imide group-containing tetracarboxylic acid prepolymer prepared in Example B and 400 g of the solution of the imide group-containing polyisocyanate blocked compound prepared in Example F was stirred well to provide the solution having a non-volatile content of 45.2% by weight and a viscosity of 82600 c.p. (at 30° C).

The solution prepared above was casted over a glass plate, dried and hardened under heating to 180° C for 30 minutes and then to 250° C for 30 minutes, and then the film formed was stripped from the glass plate to provide a flexible film. The properties of the film thus obtained were as follows:

| | |
|---|---|
| Thickness of the film | 50 μ |
| Tear strength (ASTM 1004-61T) | 370 g/mil |
| Tensile strength (ASTM 882-61T) | 15.0 kg/mm$^2$ |
| Elongation ('') | 34% |
| Tear resistance (JIS C-2318) | 340 kg/mm |
| Volume resistivity | >10$^{16}$ |
| Dielectric constant | 3.6 |
| Dielectric loss tangent | 0.024 |

EXAMPLE 4

A mixture of 400 g of the imide group-containing tetracarboxylic acid prepolymer prepared in Example C and 400 g of the solution of the hydantoin ring-containing polyisocyanate blocked compound prepared in Example H was stirred well to provide the solution having a non-volatile content of 41.0% by weight and a viscosity of 8670 c.p. (at 30° C).

The solution prepared above was casted over a glass plate in a thickness of 50 microns and dried and hardened under heating to 180° C for 30 minutes and then to 250° C for 30 minutes to provide a flat film having high toughness and high scratch resistance.

Then, the solution prepared above was diluted by industrial cresol so that the non-volatile content became 30% by weight and the resultant solution was coated and baked on annealed copper wire having a diameter of 1.00 mm at temperature of 430° C and a rate of 6.5 m/min in a vertical research tower having a length of 3 meters. The properties of the enameled wire thus obtained are also shown in Table 1.

EXAMPLE 5

To 850 g of the imide group-containing tetracarboxylic acid prepolymer solution prepared in Example D was added 26 g of Desmodur CT Staple (trade name, made by Farbenfabriken Bayer Aktiengesellshaft) and the mixture was heated to 100° C with stirring to provide the solution having a non-volatile content of 32.5% by weight and a viscosity of 1025 c.p. (at 30° C).

A plain weave glass cloth having a thickness of 0.18 mm was impregnated with the solution prepared above so that the resin content became 50% by weight to the glass cloth and then the solution thus impregnated was dried for 30 minutes at 180° C to remove the solvent.

Twelve sheets of the glass cloths thus processed were piled, heated for 10 minutes between a press machine heated to 350° C under a low pressure, and then pressed for 10 minutes under a pressure of 150 kg/cm$^2$. The bending strength of the laminate thus obtained was 43 – 48 kg/mm$^2$ at room temperature and 41 kg/mm$^2$ at 200° C and the water absorption factor thereof was 1.1%. Furthermore, the heating loss of the laminate after storing for 10 days at 250° C was 1.0% by weight.

EXAMPLE 6

To 1400 g of the prepolymer solution prepared in the process of Example C were added 233 g of a blocked compound prepared by blocking diphenylmethane diisocyanate with cresol, 250 g of cresol, and 0.02 g of dibutyltin dilaurate and then the mixture was stirred at 100° – 120° C to provide the solution having a non-volatile content of 43.2% by weight and a viscosity of 4230 c.p. (at 30° C).

The solution was coated and baked on a annealed copper wire having a diameter of 1.00 mm by means of a die under the same conditions as in Example 1. The properties of the enameled wire thus obtained are shown in Table 1.

EXAMPLE 7

To 1400 g of the prepolymer prepared by the process of Example C were added 199 g of the t-butanol blocked compound diphenylmethane diisocyanate, 190 g of cresol, and 0.6 g of lead octylate and the mixture was stirred at 100° – 120° C to provide the solution having a non-volatile content of 43.5% by weight and a viscosity of 4330 c.p. (at 30° C).

The solution was coated and baked on an annealed copper wire having a diameter of 1.00 mm by means of a die under the same conditions as in Example 1. The properties of the enameled wire thus obtained are shown in Table 1.

Table 1

| | | Example 1 | Example 2 | Example 4 | Example 6 | Example 7 |
|---|---|---|---|---|---|---|
| Structure of wire | Bare wire diameter (mm) | 1.000 | 1.000 | 1.000 | 1.000 | 1.000 |
| | Enameled wire diameter(mm) | 1.080 | 1.082 | 1.081 | 1.080 | 1.084 |
| | Film thickness (mm) | 0.040 | 0.041 | 0.0405 | 0.040 | 0.042 |
| Appearance of wire | Naked eye evaluation | good | good | good | good | good |
| Windability | Good diameter | 1 d | 1 d | 1 d | 1 d | 1 d |
| | 5 % (prestretched) | 1 d | 1 d | 1 d | 1 d | 1 d |
| Prestretched windability (good diameter) | 10 % '' | 1 d | 1 d | 1 d | 1 d | 1 d |
| | 15 % '' | 1 d | 1 d | 1 d | 2 d | 2 d |
| | 20 % '' | 1 d | 1 d | 1 d | 3 d | 3 d |
| Abrasion resistance | Repeated abrasion 600 g load (cycles) | 330 | 320 | 245 | 180 | 135 |
| | Unilateral scrapes(g) | 2753 | 2730 | 2635 | 2480 | 2510 |
| Heat Shock resistance (good diameter) | 200° C × 2 hrs | 1 d | 1 d | 1 d | 1 d | 1 d |
| | 240° C × 2 hrs | 1 d | 1 d | 1 d | 1 d | 1 d |
| | 260° C × 2 hrs | 1 d | 1 d | 1 d | 2 d | 2 d |
| Breakdown voltage | Normal state (KV) | 11.3 | 12.0 | 12.5 | 13.4 | 12.1 |
| | 260° C × 168 hrs (KV) | 10.5 | 11.0 | 12.0 | 11.8 | 10.3 |
| Crazing resistance Cut through | In water | good | good | good | good | good |

-continued

| | | | | | | | |
|---|---|---|---|---|---|---|---|
| temperature | 2.1 Kg load (° C) | | | 472 | 470 | 458 | 421 | 418 |
| Chemical property | NaOH 3% | | | 7 H | 7 H | 7 H | 7 H | 7 H |
| 20° C × 24 hrs (pencil hardness) | "5%" | | | 7 H | 7 H | 7 H | 6 H | 6 H |
| | "10%" | | | 5 H | 5 H | 6 H | 6 H | 6 H |
| | | 120° C × 30 min | 0% | ◎ | ◎ | ◎ | ○ | ○ |
| | | | 5% | ◎ | ◎ | ○ | ○ | △ |
| Blister resistance test | R-22-Oil (1:1) | | 10% | ◎ | ◎ | △ | △ | △ |
| | 70° C × 168 hrs | | 0% | ◎ | ◎ | ◎ | ○ | ○ |
| | | 160° C × 30 min | 5% | ◎ | ◎ | ○ | ○ | ○ |
| | | | 10% | ◎ | ◎ | ○ | ○ | △ |

(Note 1) The mark (d) in the table shows a wire diameter. In the prestretched windability and the heat shock resistance tests in Table 1, 1 d means that the test wire meets the requirement of the test using the same diameter as that of the test wire and 2 d means that the test wire meets the requirement in the same test using a diameter of 2 x (wire diameter).

(Note 2) The blister resistance test in the table was conducted by stretching the sample wire heat-treated for 15 minutes at 150° C to 0%, 5%, or 10%, treating the sample in R-22-oil (1:1) for 168 hours at 70° C by using an autoclave, treating the sample in a dryer for 30 minutes at 120° C and for 30 minutes at 160° C, and then observing the state of the formation of blisters of the sample.

In addition, the mark ◎ in the table stands for the case where no foams were observed; the mark ○ stands for the case where foams observed hardly, and the mark △ stands for the case where foams were observed by the naked eye.

While the invention has been described in detail and with reference to specific embodiments thereof, it will be apparent to one skilled in the art that various changes and modifications can be made therein without departing from the spirit and scope thereof.

What is claimed is:

1. A solution for forming thermal resisting polymers comprising a mixture of a prepolymer and blocked polyisocyanate compound blocked with a compound of the formula ROH wherein R represents a monovalent aromatic group or a monovalent aliphatic group in approximately stoichiometric equivalent amount to said prepolymer, said mixture being dissolved in an organic acidic solvent, said prepolymer having been prepared by reacting an organic diisocyanate or diamine and a molar excess of 1, 2, 3, 4-butane-tetracarboxylic acid or an anhydride thereof and the prepolymer having an imide group in the main chain of the molecule and an acid group at the terminals of said molecule, said blocked polyisocyanate being a blocked compound of an imide group-containing polyisocyanate prepared by reacting 1, 2, 3, 4-butane-tetracarboxylic acid or an anhydride thereof with a molar excess amount of an organic diisocyanate or said blocked polyisocyanate being a blocked compound of an amide or imide group-containing polyisocyanate having isocyanate groups at both terminals of the molecule prepared by reacting the organic tribasic acid anhydride represented by the general formula

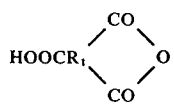

wherein $R_1$ represents a trivalent organic group with a molar excess amount of an organic diisocyanate.

2. The solution for forming thermal resisting polymers as claimed in claim 1 where either the prepolymer or the blocked polyisocyanate compound is present in an amount up to 20% in excess of its stoichiometric equivalent amount.

3. The solution for forming thermal resisting polymers as claimed in claim 2 where the solution has a non-volatile content of 20 to 60% by weight and a viscosity of 500 to 150,000 c.p. (at 30° C).

4. The solution for forming thermal resisting polymers as claimed in claim 1 where said prepolymer is formed by reacting an organic diisocyanate or diamine and a molar excess of 1,2,3,4-butanetetracarboxylic acid or an anhydride thereof at a temperature in excess of 30° C.

5. The solution for forming thermal resisting polymers as claimed in claim 4 where said prepolymer is found by reacting an organic diisocyanate or diamine and a molar excess of 1,2,3,4-butanetetracarboxylic acid or an anhydride thereof at a temperature of 130° – 200° C.

6. The solution for forming thermal resisting polymers as claimed in claim 4 where the prepolymer is formed by reacting an organic diisocyanate or diamine and a molar excess of 1,2,3,4-butanetetracarboxylic acid or an anhydride thereof in an organic acidic solvent or an organic polar solvent.

7. The solution for forming thermal resisting polymers as claimed in claim 6 where the total concentration in the prepolymer reaction system is 30 to 95% reactants.

8. The solution for forming thermal resisting polymers as claimed in claim 4 where the prepolymer is formed by reacting an organic diisocyanate or diamine and a molar excess of 1,2,3,4-butanetetracarboxylic acid or an anhydride thereof, the 1,2,3,4-butanecarboxylic acid being present in an amount of 1.1 to 2.2 moles per mole of organic diisocyanate or diamine.

9. The solution for forming thermal resisting polymers as claimed in claim 8 where the diamine is reacted to form the prepolymer by a dehydration reaction at least in part at 190° to 200° C for 2–3 hours, water being removed from the reaction system during reaction.

10. The solution for forming thermal resisting polymers as claimed in claim 8 where organic diisocyanate is reacted to form the prepolymer by a dehydration/-carbon dioxide removal reaction at least in part at 190° to 200° C for 2-3 hours, water and carbon dioxide being removed from the reaction system during reaction.

11. The solution for forming thermal resisting polymers as claimed in claim 10 where reaction is in an organic acidic solvent.

12. A process for preparing a solution as claimed in claim 1 which comprises blending said prepolymer solution and said blocked polyisocyanate in approximately stoichiometric equivalent amounts.

13. The solution for forming thermal resisting polymer as claimed in claim 9, wherein reaction is carried out in an organic acidic solvent.

14. The solution for forming thermal resisting polymer as claimed in claim 1, wherein said ROH is a cresol, a xylenol, a phenol or an alcohol.

15. The solution for forming thermal resisting polymer as claimed in claim 1 wherein said organic acidic solvent is cresol, xylenol, phenol or a mixture thereof.

* * * * *

Disclaimer 3,997,513.—*Yuzuru Noda, Makoto Kojima, Shiro Mazaki,* and *Yasutada Katashiba,* Osaka, Japan. SOLUTION FOR FORMING THERMAL RESISTING POLYMERS. Patent dated Dec. 14, 1976. Disclaimer filed Feb. 8, 1977, by the assignee, *Nitto Electric Industrial Company, Ltd.*

The term of this patent subsequent to July 22, 1992, has been disclaimed.
[*Official Gazette May 24, 1977.*]